Jan. 24, 1950 B. G. COPPING 2,495,210
AUTOMATIC VALVE FOR DISPENSING AND PROPORTIONING
SIRUP AND CARBONATED WATER
Filed March 22, 1943 4 Sheets-Sheet 1
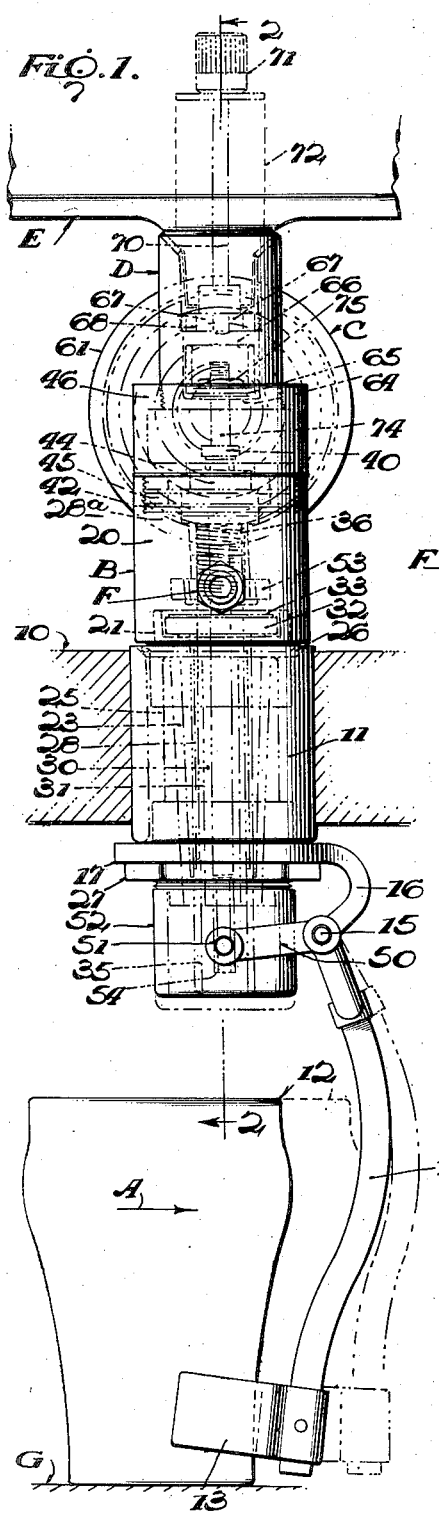
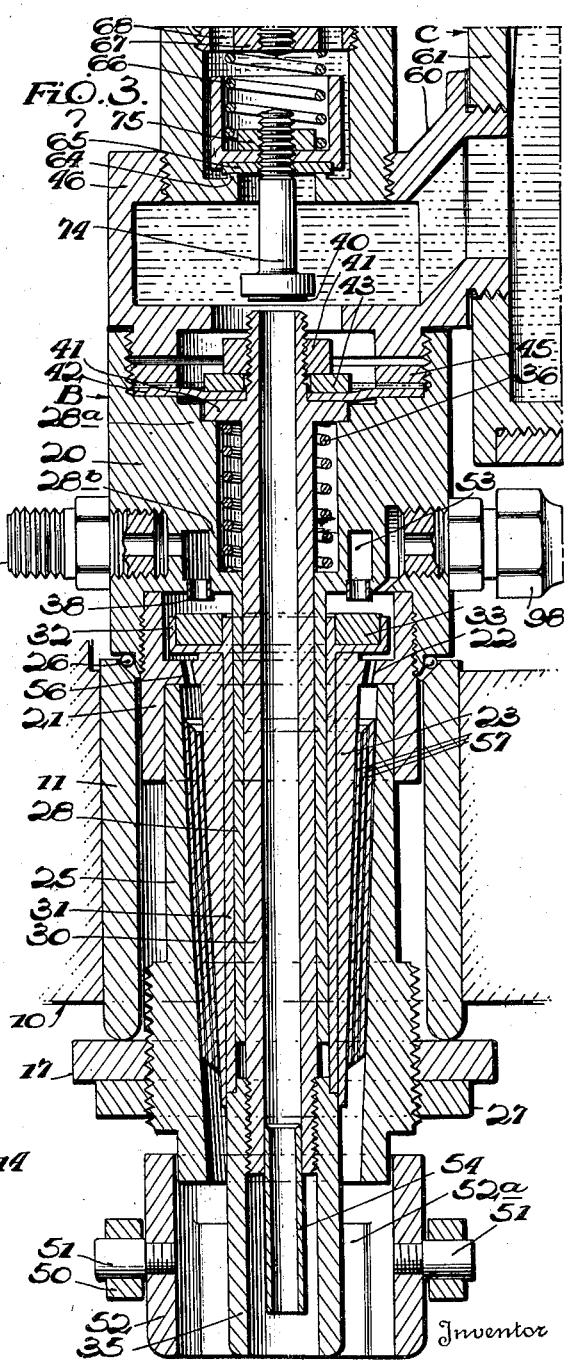
Inventor
B. G. Copping.
By [signature] Attorney

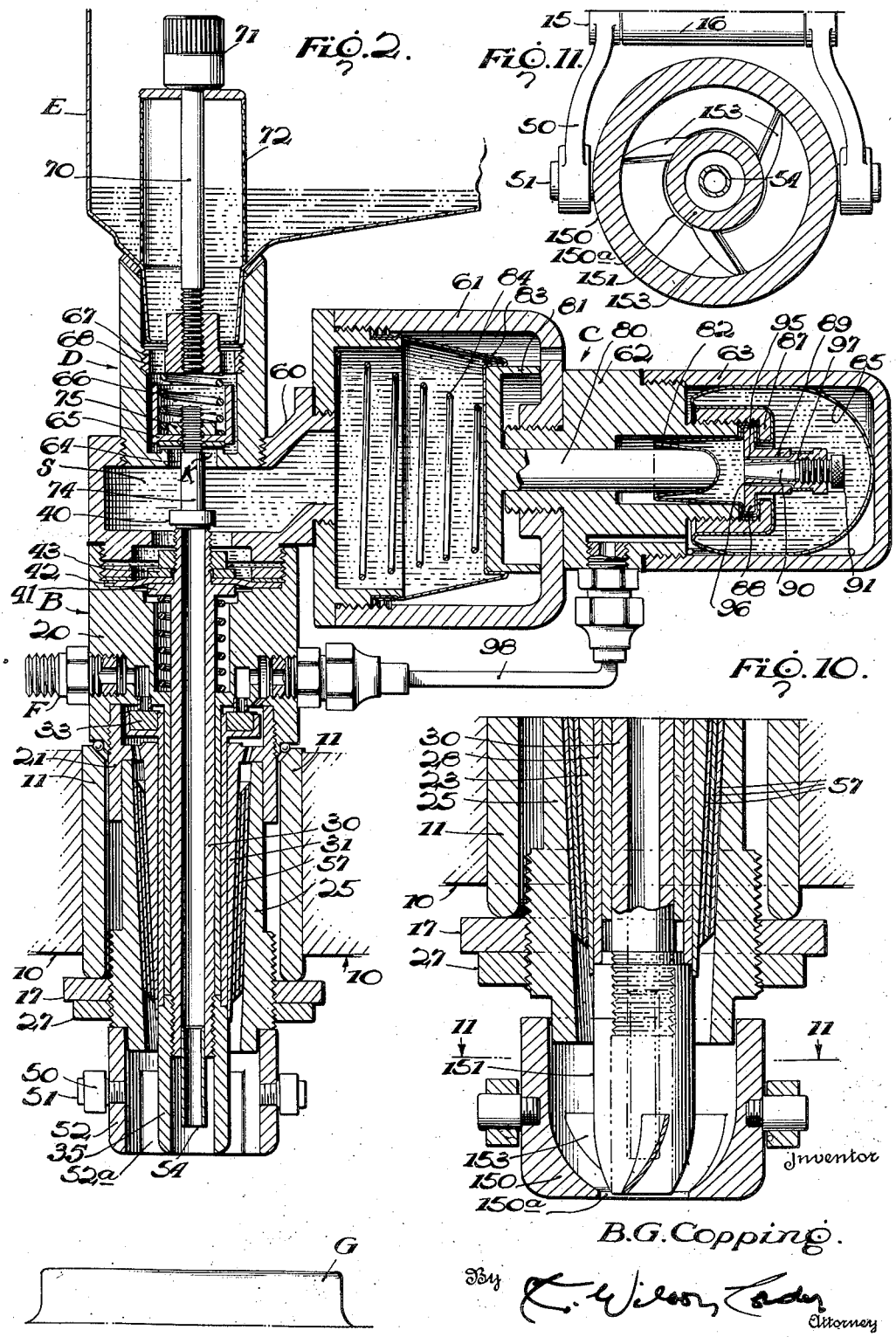

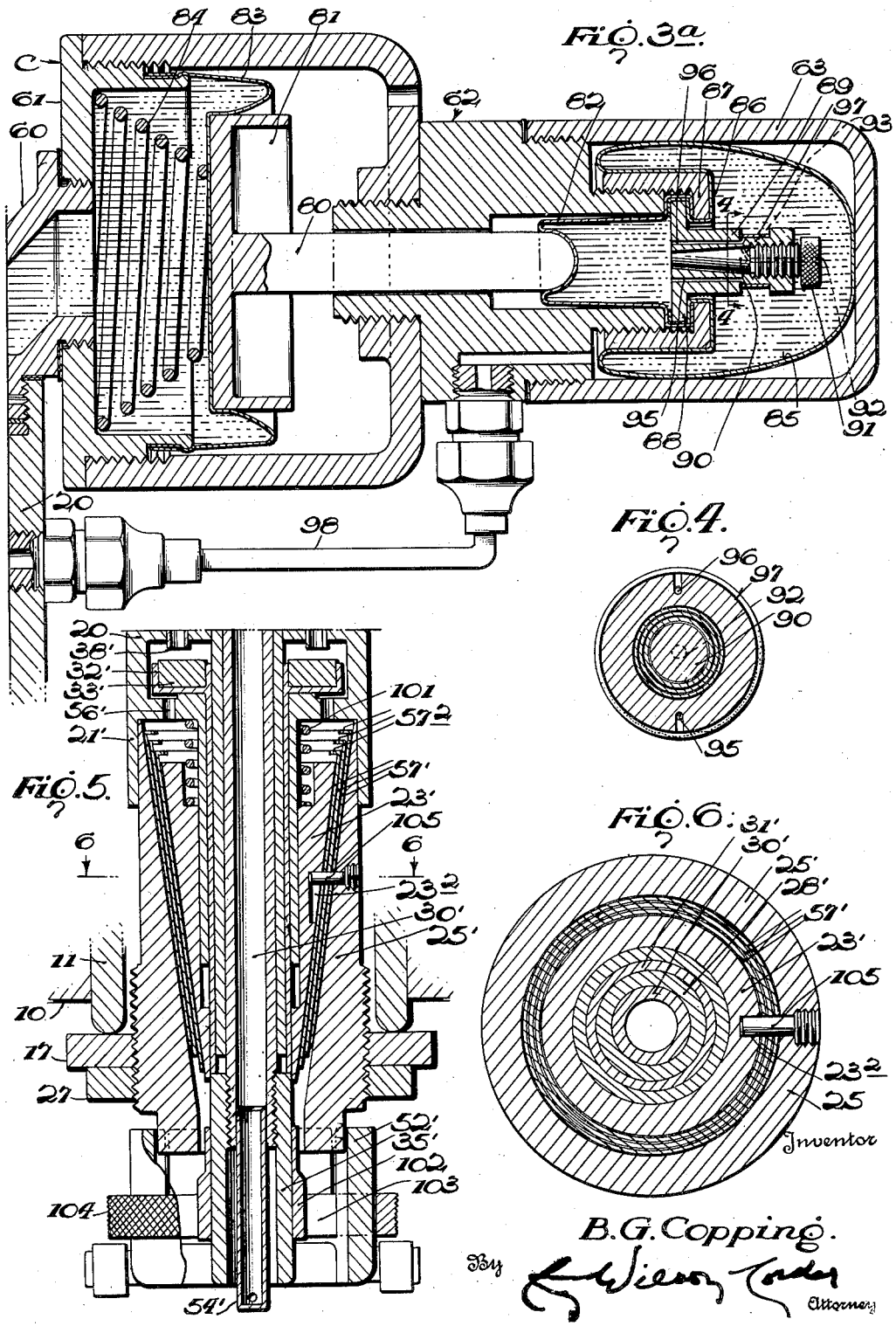

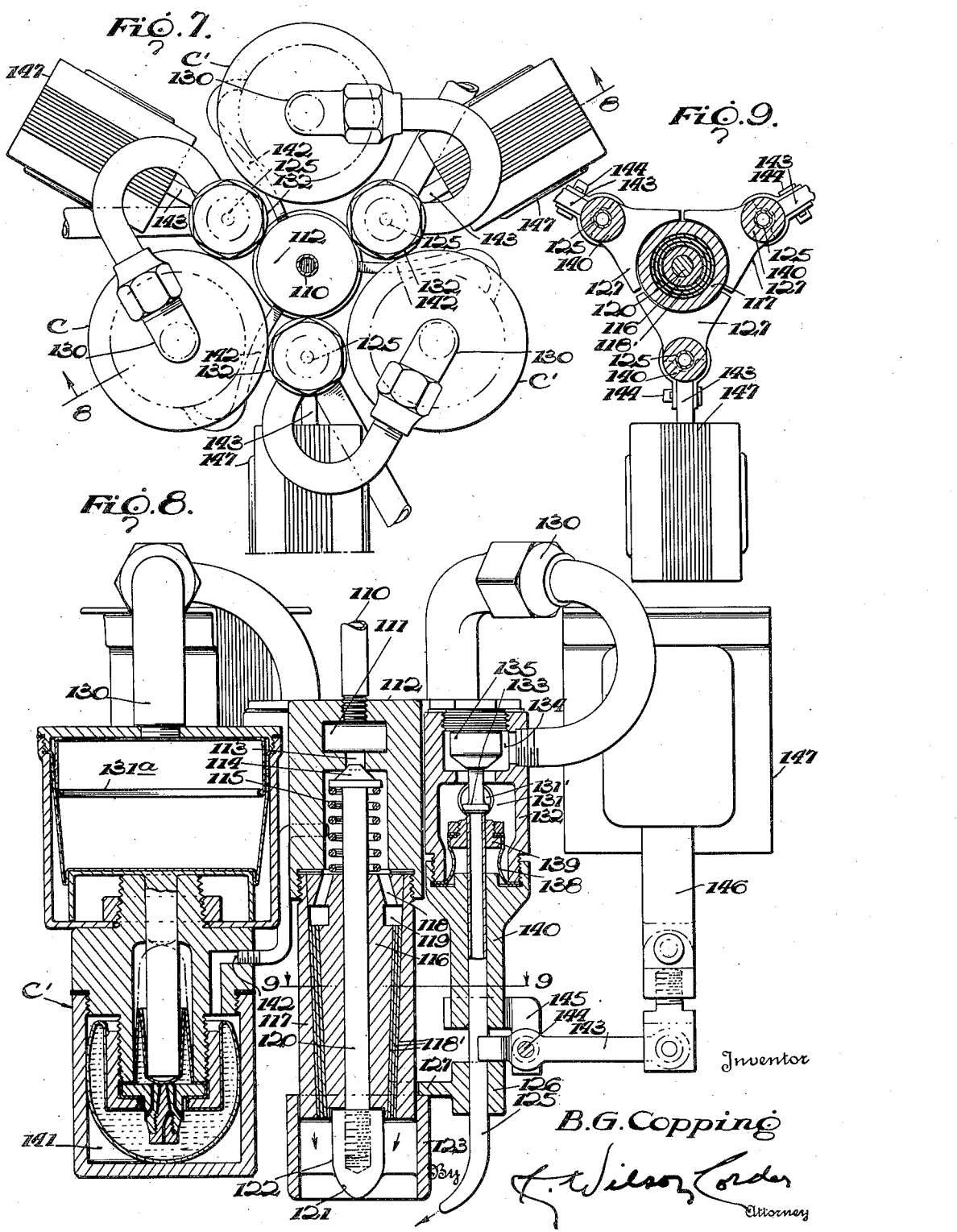

Patented Jan. 24, 1950

2,495,210

UNITED STATES PATENT OFFICE 2,495,210

AUTOMATIC VALVE FOR DISPENSING AND PROPORTIONING SIRUP AND CARBONATED WATER

Bruce G. Copping, Fulton County, Ga.

Application March 22, 1943, Serial No. 480,108

16 Claims. (Cl. 225—21)

1

This invention relates to dispensing apparatus and particularly to apparatus for dispensing liquids.

Numerous types of manually or automatically operated liquid dispensing devices have heretofore been and are currently employed to effect the controlled discharge of measured quantities of liquid into containers. The automatically operating type of liquid dispensing apparatus is customarily employed in the charging of containers which are to be subsequently closed and sealed and the manually operable type of such apparatus is usually utilized in effecting the discharge of measured quantities of liquid, intended to be immediately consumed, into open containers. The physical nature of the liquid to be handled in each instance determines to a substantial extent the characteristics of the apparatus for effecting its controlled discharge into the waiting container, and, in addition, the pressure head upon the liquid in the reservoir in which it is stored is a factor having an important bearing upon the design of such an apparatus. Again, that characteristic of a liquid to be dispensed which causes it to foam when agitated has heretofore led to the development of liquid dispensing devices designed and intended to deliver the liquid into a waiting container from a source of supply with the least possible amount of agitation and hence with the least possible creation of foam. The problem of design of a device for effecting the controlled discharge of liquid is furthermore rendered materially different in any case in which the liquid to be dispensed is charged with a gas in solution, as in the case of carbonated water, the carbon dioxide gas of carbonated water escaping from the carrier liquid quite rapidly with reduction in pressure, so much of the dissolved gas escaping from a stream of carbonated water which is suddenly relieved of all pressure above atmospheric as it issues in a turbulent manner from an orifice, that but little remains in the liquid which reaches the container or vessel from which it is to be withdrawn by the consumer.

The present invention has for an object the provision of an improved dispensing device for liquids which tend to foam when agitated, the invention providing a means for delivering such a liquid as a rapidly flowing controlled current but without agitation, so that it will reach the container in which it is to be dispensed or packaged in a comparatively quiescent condition, foaming being minimized. The invention has particular utility, however, in dealing with liquids which contain gas in solution and must necessarily pass

2 from vessels in which they are stored under relatively high pressures, rather quickly into containers or vessels open to atmospheric pressure, a very large pressure drop occurring in a relatively short time so that the tendency for the gas to escape is great. When dealing with carbonated liquids such as carbonated water it is not only helpful to cause the stream of liquid passing from the storage vessel into a container which is open to the atmosphere to flow through a conduit which is so designed that turbulence is either wholly prevented or minimized, but it is also helpful to so conduct the liquid on its way to the discharge port of the dispensing means in such manner that there is a gradual instead of a sudden pressure drop, rapid evolution and waste of gas from the issuing liquid being minimized when the liquid is discharged at relatively low velocity and pressure. The discharge mechanism which comprises the subject matter of the present invention is of such nature that a stream of carbonated water can be delivered into a vessel at atmospheric pressure in a superior manner, a gradual pressure drop not only being effected and gas liberation retarded for this reason, but a non-turbulent flow being likewise realized, the net result being a product, i. e., a body of liquid in a container under atmospheric pressure only, which contains more of its original gas content than does the product of any other type of dispensing mechanism heretofore suggested or used.

There are, of course, a very large number of dispensing devices for carbonated water in constant use, but carbonated water is not generally consumed as a beverage by itself, being generally mixed with a flavoring syrup. It is now and has heretofore been common practice in the dispensing of beverages containing carbonated water and a flavoring liquid for the operator of the dispensing apparatus to place the carbonated water and flavoring syrup successively in the glass or other container which is to be given to the customer, two distinct operations being necessary to effect this charging of the receiving vessel. Naturally the operator will prefer to accomplish the dispensing operation with the least expenditure of time and effort and it has heretofore been proposed that dispensing mechanisms for simultaneously effecting the introduction into a receiving container of metered quantities of carbonated water and flavoring syrup might be employed with advantage. For one reason or another, however, such dispensing devices have not been generally accepted. One problem associated with the design of a mechanism for effecting such simultaneous discharge of liquids has been to effect the accurate metering of the liquids so that the mixture entering the receiving container will remain unchanged during the dispensing operation insofar as the relative proportions of charged water and syrup are concerned, despite the fact that the pressure within the vessel containing the charged water may vary from time to time.

A further object of this invention is to provide a novel liquid discharge pump for a syrup or other liquid which is not under pressure other than atmospheric and which, while useful in and of itself as a separate instrumentality, is particularly suitable for use in combination with the carbonated water dispensing means above briefly described. Thus, the liquid disepensing or metering pump which I have provided is of the pressure operated type, containing a liquid displacing or plunger member which is urged on its operating stroke by the pressure of a liquid behind it. The liquid which is utilized to create the pressure which moves the liquid displacing element on its working stroke is the same liquid which is being dispensed through the pressure reducing and flow controlling portion of the dispensing apparatus, i. e., is the carbonated water itself. In such an arrangement the syrup metering means will be in operation only so long as the other liquid, i. e., the carbonated water, is flowing to the discharge port of the apparatus so that as soon as the flow of carbonated water is interrupted the forward movement of the syrup metering plunger will cease and the flow of syrup be simultaneously interrupted.

In addition, the speed of forward movement of the liquid displacing plunger of the liquid metering device will at all times be a function of the pressure of the liquid behind it and which is effecting such forward movement so that, inasmuch as the pressure liquid is the carbonated water, the liquid metering means will discharge less syrup per unit of time as the rate of discharge of carbonated water falls off due to lowering of pressure in the storage reservoir, the arrangement being, therefore, such that for each unit volume of carbonated water which is discharged a corresponding volume of syrup will be discharged, and this quite regardless of variations in the pressure upon the carbonated water. With a mechanism such as that briefly described it is only necessary for the operator to make certain that an adequate supply of both syrup and carbonated water is available. So long as both liquids are available their relative proportions in the mixture delivered into a receiving vessel will remain the same, a feature of particular importance where it is necessary for an attendant to rapidly dispense successive volumes of mixed liquids into a series of containers for the consumption of groups of customers.

The invention embodies further features of improvement in the art of liquid dispensing apparatus, including nozzle devices of novel type, one such improved nozzle construction contemplating the separate discharge of the two liquids into a receptacle and a further such nozzle construction providing means for bringing about the admixture of these liquids prior to their discharge into such receptacle. Certain features of the syrup metering means, in addition to those previously referred to, are deemed to be of paramount importance, particularly the valve mechanism for controlling the flow of syrup from a relatively large storage reservoir into the syrup receiving chamber of the syrup metering device and the flow from this chamber to the discharge port of the dispensing apparatus.

As under certain circumstances it is desired to make available for mixture with carbonated water more than one flavor of syrup the invention likewise contemplates the combination with the novel carbonated water discharge means of a plurality of syrup metering devices, the operator being enabled by means of a convenient selective control to dispense a metered amount of the desired syrup with the corresponding amount of carbonated water. The syrup metering means in each form of the apparatus is of such capacity as to be able to discharge at one operation of its plunger a larger amount of syrup than will ordinarily be needed to supply the usual receiving vessel, such as a glass of average size. The amount of syrup which is actually delivered in any one instance, however, as well as the amount of carbonated water, within the limit of capacity of the syrup metering means, is dependent wholly upon the will of the operator who may fill a small container or a large container. The apparatus, therefore, possesses great flexibility in this respect.

Numerous forms of the invention are contemplated and in adapting it for the dispensing of liquids of various characteristics the design and arrangement of its component elements may be considerably varied. Those embodiments which are illustrated in the accompanying drawings and which are hereinafter described in detail are therefore set forth by way of example only.

In the drawings:

Figure 1 shows in side elevation one form of the novel dispensing means, a portion of the support upon which it is mounted being illustrated, likewise a portion of the syrup-containing tank or storage vessel and a beverage receiving vessel;

Figure 2 is a section on line 2—2 of Figure 1;

Figure 3 is a section generally similar to Figure 2 but through portion of the apparatus only, this portion being, however, illustrated on a substantially larger scale in order that the details of the several operating parts may be more clearly perceived;

Figure 3a shows in section, upon the same relatively large scale, the remainder of the mechanism, not shown in Figure 3;

Figure 4 is a section on line 4—4 of Figure 3a;

Figure 5 is a vertical section through portion of a modified form of dispensing mechanism for liquid under pressure;

Figure 6 is a section on line 6—6 of Figure 5;

Figure 7 is a top plan view of a dispensing apparatus which is equipped with three complete syrup metering units;

Figure 8 is a section on line 8—8 of Figure 7;

Figure 9 is a section on line 9—9 of Figure 8;

Figure 10 is an axial section through the nozzle of a carbonated water and syrup dispensing apparatus, this nozzle being provided with means for effecting admixture of the two liquids as they issue therefrom; and Figure 11 is a section on line 11—11 of Figure 10.

In the dispensing of carbonated beverages the time element is of primary importance and it is highly desirable to provide a mechanism which may be quickly operated repeatedly, by one who may not be particularly skilled, but which will nevertheless insure the delivery to each successive patron of an identical beverage, containing the same proportion of flavoring syrup to carbonated water, and which also contains the maximum amount of dissolved gas. In order to attain this objective the dispensing apparatus must embody a number of instrumentalities which cooperate in achieving the desired result and an apparatus of this character is illustrated and will now be described in detail. Certain of its essential elements and subcombinations may, it will be understood, be usefully employed separately instead of in combination with others, in the development of simpler types of apparatus for special purposes. The dispensing apparatus for carbonated beverages, however, is frequently placed in the hands of the unskilled and it is, therefore, a particular concern of the applicant to provide such a mechanism which may be operated quickly, surely and without the exercise of technical knowledge, in order to best serve public demand, and which is at the same time rugged, durable, and easily cleanable after use. That form of the invention which is illustrated in Figures 1 and 2, and in Figures 3 and 3a, will first be described.

A portion of a horizontal support is indicated at 10 in the drawings this support being provided with a vertical cylindrical aperture within which the tube 11 is received, this tube comprising a base for supporting the major portion of the dispensing apparatus in such manner that it may be readily removed when necessary. This apparatus comprises the vertically elongated body generally indicated at B, and which is provided with ducts through which the carbonated water and the flavoring syrup are led downwardly in parallel streams to a point of discharge into a waiting receptacle, and also the body C of the metering device for the flavoring syrup and a tubular member D extending upwardly to the underside of a storage tank E for flavoring syrup. A conduit F is provided for leading carbonated water from a reservoir where it is stored under pressure to an aperture formed in the body B just above the support 10 the arrangement being such that the liquid flavoring syrup will flow into the dispensing apparatus from above, by gravity, while the carbonated water under pressure is led from any conveniently located flask to a point intermediate the upper and lower ends of the body B of the apparatus.

Directly below the lower end of the dispensing apparatus is positioned a support G for a receiving vessel such as a glass, as indicated in Figure 1 at 12, the carbonated water and syrup which issue from the discharge ports in the lower end of the dispensing apparatus entering the open mouth of the glass when the glass is in the position in which it is illustrated in dotted lines. To reach this position the glass must be moved in the direction indicated by the arrow A (Figure 1) the glass first engaging and then laterally displacing, from the position in which it is shown in full lines to the position in which it is shown in dotted lines (Figure 1), the bracket member 13. Bracket 13 is secured to the lower end of the depending arm 14, this generally vertically extending arm being hung by a pivot member 15 from a downwardly and inwardly curving arm 16 which in turn comprises an integral extension of an annular member 17 which encircles the body B of the apparatus and has threaded engagement therewith so as to be vertically adjustable thereon. The displacement of depending arm 14 effects operation of valves controlling the flow of both carbonated water and flavoring liquid to the discharge ports of the apparatus and the flow will be maintained so long as the glass is held in the position in which it is shown in dotted lines, the operator removing the glass when filled and being required at no time while the reservoirs which supply the liquid ingredients remain charged, to perform any operation other than to place successive empty receptacles below the dispensing nozzle and remove each one after filling.

The body B of the dispensing apparatus comprises a number of relatively simple parts assembled together, and which may be readily disassembled for the purpose of inspection, cleaning, or repair, if necessary. A major portion thereof comprises the exteriorly cylindrical member 20 which is provided with a radially extending threaded aperture for the reception of the end of the carbonated water supply tube F and an axial aperture therethrough, various portions of which are of different diameters as readily perceived from an inspection of Figures 2 and 3. At its lower end the axial aperture formed in member 20 is of relativelly large diameter and is internally threaded to receive the externally threaded upper end of a tubular member 21. Member 21 includes as an integral portion an annular inwardly extending flange 22, approximately midway between its upper and lower ends and, formed integrally with the flange 22, a tubular core 23, this core extending downwardly for a substantial distance below the lower end of member 21. The inner surface of this core is truly cylindrical and coaxial with cylindrical member 21 and its outer surface is frustoconical, tapering downwardly very gradually from flange 22 to its lower end. Below member 21 and coaxial therewith is a tubular element 25 the upper end of which is telescoped within and rigidly secured to member 21, the inner surface of this tubular element 25 being frusto-conical with a downward taper and coaxial with the frusto-conical outer surface of the core 23, both frusto-conical surfaces having the same angle of taper with their common axis so that these mutually facing surfaces define between them a duct which is annular in cross section, which decreases in inner and outer diameter from top to bottom, but which is of contant width. It is upon the enlarged lower end of element 25, which is exteriorly threaded, that the annular member 17 previously referred to is mounted, and in the installation of the dispensing apparatus the body B is passed downwardly through the tube 11, which has been previously affixed to the support 10, until the lower annular shoulder of the body member 20 contacts with the annular upper end of tube 11, or with a washer element 26 interposed between mutually facing frusto-conical surfaces of shoulder and tube, the member 17 then being applied and adjusted upwardly until its upper surface closely engages the lower end of tube 11, a lock nut 27 then being applied to maintain annular member 17 in this position, the tube 11 being thus firmly clamped and the dispensing apparatus tightly affixed to the support, but in such manner as to be readily removable.

The lower portion of part 20 is in the form of an elongated tube with cylindrical coaxial inner and outer surfaces, this portion of the part 20 being indicated at 28, its outer surface being concentric with and equidistantly spaced throughout from the cylindrical inner surface of the core 23. The thickened upper end of the part 20, which is indicated at 28a, and the depending tubular portion 28, are interconnected by an intermediate tubular portion 28b, which is of larger interior diameter than the depending guide portion 28 and of smaller external diameter than portion 28a, as clearly shown in Figures 2 and 3.

Supported within and guided by the depending guide portion 28 of part 20 is a vertically reciprocable tubular member 30 hereinafter referred to as the duct for leading downwardly a metered flow of flavoring syrup when the dispensing apparatus is in operation and slidably engaging the outer surface of the guide portion 28 of part 20, is the cylindrical hollow stem 31 of a valve generally indicated at 32 and located in the recess formed in the upper end of member 21, valve 32 being annular in form with an upwardly opening recess to receive an annulus 33 of cork, rubber or the like. When the apparatus is in operation the part 20 remains stationary at all times whereas the duct 30 may be vertically reciprocated, and likewise the valve 32.

At its lower end the liquid duct 30 is exteriorly threaded to receive the interiorly threaded upper end of a cylindrical nozzle part 35, part 35 having an exterior shoulder at its top to receive the lower end of the cylindrical valve stem 31. It is clear that, because of this arrangement, vertical elevation of the nozzle part 35 will result in upward movement, not only of the duct 30, but also of the valve stem 31 and the valve mounted on the upper end of the stem. Normally a spring 36 which encircles the upper end of duct 30 and which is housed within the bore in the upper portion of part 20, maintains the duct 30, nozzle member 35, and valve 32 in the positions in which they are illustrated in Figure 2, with the annular upper surface of valve element 33 seated against the annular lower ends of the short inserted tubes 39 of member 20, and the upper end of duct 30 seated against the downwardly facing surface of a valve 40, duct 30 being provided at its upper end with an outwardly projecting flange 41 which comprises an abutment for the upper end of the helical spring 36. Encircling the upper end of duct 30, just above flange 41, is an annular flexible diaphragm 42 the inner margin of which is tightly clamped between flange 41 previously referred to and an annular washer 43 which is maintained in clamping engagement with the diaphragm by a nut 44 having threaded engagement with the exteriorly threaded upper end of duct 30. The outer margin of diaphragm 42 is tightly clamped between an upwardly facing shoulder of member 20 and a clamping ring 45 having threaded engagement with the threaded interior wall of the cylindrical bore formed in the upper end of member 20. The upper end of duct 30 is at all times positioned within a chamber S, one wall 46 of which is mounted upon the upper end of member 20 as shown, this chamber containing a body of syrup or other liquid to be dispensed and it is a function of the diaphragm 42 to prevent the downward leakage of this liquid through the space around the duct 30 while permitting the duct to move vertically in the manner previously described in order that its upper end may be closed by being brought tightly against the valve 40 or may be opened to permit the inflow of liquid, (Figure 3).

This vertical movement of duct 30 is, as aforesaid, and likewise the movement of valve 32, effected by applying a depressing force to the nozzle part 35 and this downward force is transmitted to the nozzle when the receptacle 12 is moved from the position in which it is shown in full lines to the position in which it is shown in dotted lines (Figure 1), the pivoted arm 14 having rigidly attached to its upper end a laterally extending bifurcated part 50 the arms of which are provided at their ends with aligned cylindrical apertures to receive, respectively, the outer ends of cylindrical pins 51, the inner ends of these pins being fixed in a sleeve 52 encircling and concentric with the tubular nozzle part 35 previously described. Radial webs 52a connect the sleeve 52 to the nozzle part 35 so that the nozzle part 35 is lowered when the sleeve 52 is depressed by the action of the operator in bringing a glass or other vessel into filling position, the spring 36 effecting upward movement of the nozzle part and its connected sleeve 52 when the receiving vessel is removed, the depending arm 14 being simultaneously moved from its dotted line to its full line position.

It is apparent, therefore, that the mechanism so far described provides a valve-controlled duct leading downwardly from a body of flavoring syrup, and a valve-controlled duct leading downwardly from the annular chamber 53 formed in member 20, and which chamber is at all times in open communication with the conduit F leading from the source of carbonated water under pressure, and that these valves are simultaneously opened and closed, being normally maintained in closed position by the action of the spring 36, but being readily opened and maintained in open position as long as desired by the action of the operator in placing a receiving vessel in position to be charged. The duct 30 is of simple nature providing a direct channel for the downward flow of liquid by gravity, this duct being of relatively large diameter and being preferably but not necessarily provided with a thin walled discharge tube 54 at its lower end. The duct for carbonated water, however, includes the annular channel defined by the mutually facing inner and outer frusto-conical surfaces of member 25 and core 23, the upper end of this annular channel communicating with the chamber within which valve 32 is housed through short ducts 56 formed in the annular flange-like portion 22 of member 21. This portion of the carbonated water duct likewise contains one or more relatively thin frusto-conical members 57, of which three are shown in Figures 2 and 3 of the drawings, these members being nested, as shown.

The frusto-conical outer face of the outermost or largest member 57 is maintained in spaced relationship to the frusto-conical inner face of member 25 by means of spacing ribs 57a integral with member 57, so that there is a space between these surfaces which is approximately $2/1000$ or $3/1000$ of an inch in width, measured radially of the axis of the nozzle. Similarly the mutually facing surfaces of the core 23 and the innermost frusto-conical member 57 are similarly spaced apart, likewise the mutually facing surfaces of the respective members 57. By reason of this arrangement of core 23, member 25, and the several intermediate frusto-conical elements 57, four chambers of annular cross-section, which are extremely narrow but relatively wide and long, are formed and it is this association of parts which is relied upon to absorb the pressure energy of the carbonated water as it flows toward the nozzle without causing it to depart from streamline flow and become turbulent. The effect is such that the carbonated water is delivered at the lower end of this energy absorbing means at practically zero pressure, but without turbulence, and runs down the outer surface of the nozzle part 35 to drop into the waiting receptacle, the syrupy admixture simultaneously flowing through discharge tube 54 and being thus delivered into the receptacle centrally of the downflowing stream of carbonated water.

One problem which is involved in the design of an apparatus for the dispensing of mixed liquids is to provide means for insuring that the two liquids are always supplied in the same proportion, regardless of the quantity delivered. In accordance with this invention a metering means of novel character is provided for the delivery of volumes of flavoring syrup in fixed proportion to the volumes of carbonated water supplied, this means being activated when the flow of carbonated water is initiated, rendered inactive when the flow of carbonated water is interrupted, and operated by pressure derived from the carbonated water. In the embodiment of the invention selected for disclosure the syrup metering means generally indicated at C comprises the member 46 previously referred to, which is mounted on the upper end of the body B of the apparatus, a short laterally extending neck 60, a relatively large casing 61, a supporting block 62 and a housing 63. The tubular upward extension D includes an annular upwardly facing seat 64 for a valve 65, seat 64 encircling discharge aperture K through which liquid passes from storage tank E to chamber S, valve 65 being normally pressed downwardly and maintained in closed position by a helical spring 66, the upper end of which abuts against the lower surface of an annular disc 67, this disc being provided with perforations 68 for the downflow of liquid, and having threaded engagement with the cylindrical inner wall of member D so that it may be adjusted vertically. A spindle 70 having a knurled handle 71 is affixed to disc 67 by means of which rotation of this disc, and vertical adjustment thereof, may be effected without disturbing the cylindrical strainer indicated at 72, which is provided to prevent lumps of flavoring material from passing downwardly into the dispensing apparatus.

Valve 65 supports the depending member 74, to the lower end of which valve 40, previously referred to, is affixed, the valve 40 being adjustably carried by valve 65 inasmuch as the upper end of the connecting member 74 has threaded relation with valve 65, being located in any desired position of adjustment by means of a lock nut 75. It will be clear that, when the duct 30 is lowered as a receiving container 12 comes into position to be filled, the valve 65 will seat on its seating surface 64 and flow of liquid from the reservoir E into the chamber below is interrupted, whereas the upper end of duct 30 will be opened for the flow of liquid, this end receding from closure valve 40. When the container 12 is withdrawn from charging position the duct 30 will of course, be lifted by spring 36, the valve 40 will first seat and the valve 65 will be immediately thereafter unseated or moved to the position in which it is shown in Figure 2, permitting the supply of fluid in the metering chamber to be replenished.

The slide block 62 is provided with a horizontal axial bore within which is slidably supported a rod 80 which carries at one end the relatively large disc-like head 81, within the metering chamber, and the other end of which is rounded and is adapted to be engaged at all times by a portion of the flexible wall of a fluid cell 82. When cell 82 is expanded by the internal pressure of fluid introduced into it piston 81 will be advanced toward the left (Figures 1 and 3a), the piston head 81 carrying with it the central portion of a flexible diaphragm 83 which serves as the displaceable end of the metering chamber S, a light compression spring such as 84 being preferably positioned within the metering chamber to oppose the advancing movement of the piston. Within the housing 63 is a second cell, indicated at 85, the wall of which is formed of flexible materials, the otherwise free margins of the cells 82 and 85 being clamped within an annular groove defined by the reduced annular end surface of the guide block 62 and the inturned annular flange 86 of a coupling 87 threaded onto the reduced end portion of the guide block, the peripheral flange 88 of a metering device 89 being likewise clamped in this annular space.

Metering device 89 comprises a central cylindrical portion provided with a longitudinal bore the outer (right-hand) end of which is threaded and the inner end of which is frusto-conical. Disposed within this bore is a plug 90 the outer end of which has threaded engagement with the threaded portion of the bore and the inner end of which is frusto-conical, having the same degree of taper as the inner wall of the bore. Plug 90 is provided with an enlarged knurled head 91 by means of which it may be revolved and hence axially adjusted with respect to member 89 so that the distance between its conical outer surface and the conical inner wall surface of member 89 may be regulated as desired. The threaded end of plug 90 is axially apertured, this aperture being indicated at 92, branches 93 extending radially from the inner end of aperture 92 to the exterior of the plug, the outlet ports of these branches being so located that fluid passing outwardly is delivered into the space between the frusto-conical surface of the plug and the frusto-conical surface of member 89 and thence moves toward the left (Figures 2 and 3a) into the interior of the flexible cell 82. Ducts paralleling the axis of plug 90 are indicated at 95 and 96, respectively, these ducts also bringing the interior of cell 82 into communication with the interior of cell 85, but being effective only to permit the transfer of liquid from cell 82 to cell 85 and not in the reverse direction, by reason of the action of a flap or non-return valve in the nature of a rubber band 97 encircling plug 90. This band will expand and permit escape of liquid from the ports of ducts 89 over which it passes but will effectively close the ports when the pressure in cell 85 is greater than that in cell 82. It is therefore clear that liquid which passes from cell 85 into cell 82 must necessarily pass through duct 92 and through the annular passage defined by the mutually facing frusto-conical surfaces of members 89 and 90, whereas, fluid can flow in the reverse direction not only through this annular duct but likewise through the side passages 95 and 96, permitting relatively rapid retraction of the plunger head 81 after that plunger has been moved on its operating stroke.

The interior of housing 63 is in constant communication with the chamber within which the valve 33 is positioned, as clearly seen in Figure 2, the connecting conduit being indicated at 98. The arrangement is such, therefore, that, when valve 33 is lowered, and carbonated water under full pressure in the valve chamber, the flexible wall of cell 85 of the metering device is subjected instantly to the full pressure which exists in the carbonated water receptacle. This pressure initiates the flow of the liquid content of cell 85, which will also be water, through duct 92, branch ducts 93, and the annular metering passage, into cell 82, causing the relatively slow expansion of that cell and movement of the metering plunger on its operating stroke. This movement will continue (within the limits of the apparatus) as long as valve 33 is open, the rate of displacement of liquid by the plunger 81, and hence the feed of liquid through the vertical duct 30, being in exact proportion to the rate of flow of carbonated water through the carbonated water duct to the discharge nozzle. When valve 33 is closed the fluid pressure upon the outer surface of cell 85 will be immediately relieved, the spring 84 will return the piston 81 to original position, and the expanding cell 85 will force water from the casing 92 through duct 98 back into the chamber within which valve 33 is located, from which chamber the water will eventually pass downwardly to the discharge nozzle.

Particular attention is directed to the nice balancing of all factors involved in the instant dispensing operation, it being apparent that the single actuating element—carbonated water—is under the same pressure throughout the system; the temperature of the water in the metering element and the carbonated water are substantially the same; and they flow through passages having the same hydraulic characteristics, this resulting in a uniformity of ratio between syrup and water which does not vary, and a finished drink the quality of which is enhanced by this perfect measuring of component elements.

The rate of flow of syrupy liquid may be increased by longitudinally adjusting the plug 90 so as to provide a wider annular passage or may be decreased by narrowing this annular passage, but in any event will be proportional to the flow of carbonated water.

It may be further noted that the unique association of valve 40 with duct 30 and discharge tube 54 results in an instantaneous stoppage of the flow of syrup upon seating of the valve, it being apparent that such involves what amounts to a pipette action, the top of the tube being closed with an air-tight seal, with the result that no fluid, or even a single drop of fluid, may emerge from the lower end thereof until the top seal is broken. This is particularly important in the case of devices of the instant type where the problem of "after drip" with attendant factors of sanitation, attraction of flies and the like, has heretofore only been partially solved. Applicant's structure discloses a simple and workable solution founded upon elementary laws of physics.

In the form of the invention shown in Figures 4 and 5 the several frusto-conical elements in the pressure reducing portion of the carbonated water duct are more widely conical, the elements thereof making larger angles with their common axis, and each is provided at its larger end with a plurality of inturned flange-like projections, the conical elements being indicated at 57' in these figures and the inturned flanges or lugs, which are spaced vertically from each other as shown, being indicated at $57^2$. The core 23' in this case is a separately formed element and is normally pressed downwardly by means of a helical spring 101. Encircling the nozzle part 35' is a sleeve 102 connected by radial webs 103 to a ring 104 which encircles the sleeve 52', the webs 103 extending, respectively, through vertical slots formed in sleeve 52'. The ring 104 is in position to be conveniently grasped by the operator and, by raising this ring the upper end of the sleeve 102 will be brought into contact with the annular lower end of the core 23', and the core thus lifted against the action of spring 101. As the core moves upwardly the inturned lugs $57^2$ of the several frusto-conical members 57' will be successively engaged from below and eventually all three elements 57' will be lifted. The effect of this operation is to increase the widths of the several annular ducts defined by the core, the three frusto-conical elements 57', and the outer member 25' to permit the more ready flow of liquid therethrough so that, in the event that the control valve is operated when these several parts are positioned in the manner described, the spaces between the conical duct-defining surfaces may be flushed by liquid flowing under pressure and at high speed and thus cleaned. A pin 105 projects through the wall of member 25' and through slots formed in the several frusto-conical elements 57' into a slot $23^2$ formed in member 23. The several slots formed in members 57' for the reception of pin 105 vary in length and as a result the upward movement of the outer element 57' is brought to a definite stop before the upward movement of the intermediate element 57', thus assuring that these members will be separated when the ring 104 is raised, separation of the innermost and intermediate elements 57' and separation of the innermost element from the core 23' being positively effected in like manner. After the flow of cleansing carbonated water has been terminated the core and elements 57' will be returned to original positions by the action of spring 101.

In commercial practice it may be desirable to form the frusto-conical elements as described heretofore from a continuous sheet or strip of appropriate material, and this may be done by providing for suitable spacing by placing a piece of stainless steel or the like which has first been suitably cut, perforated, or otherwise treated, upon a similar sheet of plain material, and rolling the two thus closely associated, in the form of a spiral, the spacer elements permitting adequate passage of fluid between the solid sheets, and the combined elements providing the superior results attributed to similar structure formed in a somewhat different manner. Other modifications will suggest themselves to those skilled in the art.

It should be noted that the frusto-conical elements forming the pressure reducing portion of the carbonated water duct are carefully designed and conceived in the light of the best engineering practice, fundamental laws of hydraulics and gas having been utilized and explored in accomplishing the desired result. Large variations in flow accrue from changing diameters and an important part of the instant invention resides in providing optimum spacing of very closely controlled diameters in the case of elements such as 57. Previous attempts to accomplish the desired result, as for example, passing carbonated water through a chamber containing beads or other loose particles, have not been successful, possibly because of constant variations in passage-size under such conditions, and because the factors of coordination and balance inherent in the instant disclosure were unknown or at least unappreciated by other inventors in this field.

As it is sometimes desired to provide, in a dispensing apparatus, means for supplying any one of several flavoring syrups with carbonated water the invention may be embodied in an apparatus containing a plurality of reservoirs for syrups of different flavors and having a single duct for carbonated water, the arrangement being such that the operator can readily select the desired flavoring syrup and yet realize the full advantages of the invention, i. e., realizing proportionate flow of the carbonated water and selected flavoring syrup, likewise realizing the advantage flowing from the use of the means for effecting the delivery of the carbonated water at practically zero velocity and without turbulence.

Such a mechanism is illustrated in Figures 7, 8 and 9. It includes a centrally located duct for carbonated water and three laterally located syrup metering devices which may be selectively operated. The conduit leading from the source of carbonated water is indicated at 110, discharging into a chamber 111 formed in the upper end of the generally cylindrical block 112. From chamber 111 the carbonated water may pass downwardly through central port 113 when and if the conical closure valve 114 is in lowered or open position, this valve being normally pressed into seated position by a helical spring 115 the upper end of which rests against the underside of the valve and the lower end of which rests upon the upper end of the frusto-conical core 116, core 116 being housed with a tubular shell 117 the inner surface of which is likewise frusto-conical. The upper end of shell 117 projects into a recess formed in the lower end of body 112 and is secured in such position, the parts preferably having threaded engagement with each other. As will be observed from an inspection of Figure 8 the frusto conical outer surface of core 116, at the upper end of the core, seats closely against the frusto-conical inner surface of the upper end of the shell 117, the core 116 being thus supported in the position in which it is shown. Passages 118 formed in this portion of the core permit the downward flow of carbonated water therethrough into an annular recess 119, this recess comprising a circumferential distributing passage for bringing the downflowing carbonated liquid into free communication with the upper ends of the annular passages or ducts defined by the mutually facing frusto-conical surfaces of the core 116, tubular body member 117, and the several intermediate frusto-conical elements 119, fabricated and disposed with relation to each other substantially in the same manner as the corresponding elements 57 of the first form of the invention described, and designed and intended to provide restricted passages of such character as to result in the delivery of the carbonated water at the discharge port of the apparatus at practically zero velocity and without turbulence.

The conical valve 114 is secured to the upper end of a vertically reciprocable valve stem 120 upon the lower end of which is threaded a nut 121. Nut 121 is connected by radial webs 122 with a sleeve 123 which may be drawn downwardly by a mechanism such as that described in connection with the form of dispensing apparatus first referred to, downward movement of the sleeve resulting in downward movement of rod 120 and lowering of valve 114, thus permitting flow of carbonated water through the pressure reducing means and its discharge through sleeve 123. The several syrup delivery tubes, in the form of the device illustrated, are three in number, disposed 120° apart around the axis of valve stem 120, one of these tubes being indicated at 125 in Figure 8, the lower end thereof being inturned so that liquid discharged therefrom will enter any glass or other container placed directly below the carbonated water discharge port. Fixed on liquid discharge duct 125 is a collar 126 having a portion 127 extending toward the body member 117 and overlying the upper edge of sleeve 123. By electro-magnetically operated means, the details of which may be varied widely without departing from this invention, any one of the three liquid ducts 125 may be depressed and simultaneously with the depression of any such duct 125 the collar 123 will be simultaneously lowered, valve 114 being thus opened.

Opening of valve 114 and admission of carbonated water under pressure into the chamber in which the spring 115 is housed also initiates the operation of the three syrup metering mechanisms C', each of which is generally similar to the metering mechanism of the form of the invention first described and which, therefore, need not be disclosed in detail. The liquid metering means thus called into action includes a conduit 130 leading from a source of syrup supply to a chamber 134 of valve casing 132. The upper end of duct 125 is at all times within a chamber 131, just below chamber 134 and communicating with that chamber when the control valve 135 is lifted. Rigidly connected to valve 135 is the second valve 133, adapted to close the upper end of the duct 125 when this duct is in its normal closed position, as shown in Figure 8. Chamber 131 is in communication with the chamber 131a of the metering means, one port of the connecting conduit being indicated at 131'.

A diaphragm 138 of generally tubular nature has its upper end secured to a member 139 fastened upon and encircling the upper end of the liquid duct 125, and its lower end clamped between the lower annular edge of member 132 and an upwardly facing shoulder of the stationary frame member 140. The operation, however, of the metering means in its entirety is the same as that of the first form of the invention described, the supply of liquid to the metering chamber 131 being cut off while a metered stream of liquid is descending through duct 125 into the receiving container and, when duct 125 is raised and the dispensing operation ceases, the upper end of the duct is closed by valve 133 and the supply source again brought into communication with the upper chamber 134. The conduit connecting valve body 112 with chamber 141 of the metering means C' is indicated at 142 and the metering operation is initiated, therefore, as before, by the pressure of the carbonated water and continues during the period that valve 114 is unseated. Conveniently the collar 126 on each of the ducts 125, and hence the sleeve 123, may be pressed downwardly by means of a lever 143, pivoted at 144 to a bracket 145 affixed to the lower end of member 140. To the longer arm of lever 143 is pivotally connected the lower end of a solenoid plunger 146, or other electro-magnetically actuated member, plunger 146 being attracted by a magnet 147 when that magnet is energized. Any convenient system of switches may be employed for selectively actuating the several solenoids in the dispensing of beverages and, if desired, the number of syrup supplying mechanisms may be increased to four, five, or more without departure from the invention.

In Figures 10 and 11 of the drawings there is shown a mixing nozzle which may be employed, if desired, instead of that form of nozzle shown in Figures 1, 2, 3 and 5. The nozzle of Figures 10 and 11 contemplates admixture of the carbonated water and the syrup or flavoring liquid at the instant of discharge of these liquids from the dispensing apparatus, and to effect that objective, the encircling sleeve 150 is provided with an axial discharge port 150a of reduced size, the inner wall of the sleeve curving toward the axis of the nozzle as the discharge port is approached, as shown in Figure 10. Likewise the outer surface of the inner nozzle part 151 curves toward the axis of this member, the radius of curvature of the outer surface of member 151, however, being greater than the radius of curvature of the inner surface of sleeve 150 so that the duct between these members narrows or has a smaller cross section as the discharge port is approached. Projecting outwardly from the rounded end portion of the inner nozzle member 151 are a plurality of vanes or curved baffle members, indicated at 153, these vanes being so shaped as to give to the downflowing stream of carbonated water a tendency to revolve about the axis of the dispensing nozzle as it descends into the cup, thus promoting admixture with the central stream of syrup or other liquid. The other portions of the nozzle shown in Figures 10 and 11 are substantially the same as that illustrated in Figures 2 and 3, and need not be specifically described.

In each of the several forms of the invention selected for disclosure substantially the same type of means is employed for effecting the relatively slow uniform pressure drop in the carbonated liquid as it approaches the mouth of the discharge nozzle, while maintaining streamline flow. For a dispensing apparatus of the general type described the particular pressure reducing means illustrated is most practical, being of simple design and easily cleaned when necessary. The invention contemplates, however, other forms of the pressure reducing means which, especially when the problem of dispensing a fluid other than carbonated water is under consideration, may be considered to be eminently suitable. It will be understood, of course, that in the design of the pressure reducing means the character of the liquid which is to be dispensed must be given full consideration, especially its absolute viscosity and its density. It is known for example that the absolute viscosity and density of a liquid to be handled should be known in order to determine the maximum velocity of flow which may be permitted to occur while maintaining streamline flow, i. e., without causing turbulence or transverse movements of the particles of flowing liquid. As previously stated, the flow of carbonated water from a tank to a receiving vessel should be streamline or non-turbulent if the loss of absorbed gas is to be minimized. Hence, as a primary consideration in the design of a pressure reducing means which comes within the import of the present invention it is first desirable to consider the nature of the liquid to be dispensed and to obtain some idea of the maximum permissible velocity of flow of that liquid which may be permitted without causing turbulence.

For any given liquid, under any given conditions, there exists a critical velocity the value of which depends upon the ratio of the inertia forces involved to the viscous forces. One method of determining the critical velocity of a given liquid flowing through a pipe or conduit involves the computation of what is called the Reynolds number for that liquid, the Reynolds number of the liquid being determined from the following equation:

$$R_e = \frac{\text{pipe diameter} \times \text{fluid velocity}}{\text{Kinematic viscosity}}$$

or $$R_e = \frac{DV}{u/p}$$

where

D = Pipe diameter
V = Fluid velocity
u = Absolute viscosity
p = Density of liquid when the Reynolds number exceeds an upper critical value of from 2000 to 3000 turbulent flow occurs, whereas, when the Reynolds number is below this critical value streamline flow occurs.

With the knowledge in mind that the Reynolds number may not be exceeded if streamline flow is to be maintained, and that the diameter of the pipe through which the liquid flows, as well as the absolute velocity and density of the liquid are factors in the Reynolds number formula, the design of a specific means for effecting the necessary pressure drop in the flowing liquid can be undertaken with the aid of further formulae of proven value heretofore used in the design of conduits utilized for the transmission of flowing liquids.

It has been previously said that the carbonated liquid must be stored under considerable pressure. In this state, the liquid has potential, or "stored-up," energy by virtue of its pressure. Before the drink can come to rest in a glass or cup, this energy must be used up. One way of using up this potential energy, which is now almost universally used, it to allow the liquid to squirt out through a small nozzle. In this case, the potential energy is immediately converted into kinetic, or "velocity," energy, and causes the liquid to come rushing out at a velocity far above the "critical" velocity for streamline flow. The turbulent stream of liquid thus created hits violently into the glass, and the "velocity" energy is eventually turned into heat in the liquid through the violent turbulence of the liquid in the glass.

There is another way in which the potential, or "stored-up" energy of the liquid may be used up. That is by arranging to have the potential energy used up by the friction created during the flow of the liquid through the dispensing system. It is possible to use up virtually all of the energy of the liquid in friction, so that the liquid issues from the discharge end of the nozzle at atmospheric pressure, and virtually no velocity, and the present invention contemplates the utilization of a friction means for accomplishing this objective. In the design of such a means to act upon a selected liquid, which shall be capable of practical use, it is desirable to first consider the Reynolds number equation above set forth.

The kinematic viscosity is constant for a given liquid at fixed temperature, so that the Reynolds number varies as the product of the pipe diameter and the velocity. The significant feature of this is that, by making the pipe very small, we can make the velocity very high and still have the same Reynolds number, i. e., less than 3000, and maintain streamline flow.

The commonly used equation for flow of liquids in pipes is as follows:

$$h_f = f \cdot \left(\frac{L}{D}\right) \cdot \left(\frac{V^2}{2g}\right)$$

where:

$h_f$ = loss of pressure due to friction
$f$ = a coefficient depending on Reynolds number
L = length of the pipe D—diameter of pipe
V=velocity of flow
$g$ =acceleration due to gravity An examination of this formula shows that the loss of pressure due to friction in the pipe increases as the square of the velocity and inversely as the diameter of the pipe. Thus, if the pipe is made $\frac{1}{10}$ as large and the velocity increased ten times (as may be done without causing turbulent flow), the length of pipe needed to use up the pressure in the liquid under these conditions will only be $1/1000$ of what it was before. It is naturally necessary to increase the number of pipes as they are made smaller, in order to carry the same quantity of liquid. This increase must be in inverse proportion to the change in diameter. That is, if it is decided to reduce the diameter to $\frac{1}{10}$, and increase the velocity ten times, as above, then ten of the small pipes will be needed to carry the same quantity of liquid per second as the original pipe.

While it is possible to accomplish the desired result by the use of a number of small diameter tubes such a means has certain practical disadvantages, the chief of which are that the small tubes cannot readily be cleaned, and that a nozzle designed this way is not easily made adjustable for various pressures. It is therefore desirable to design some other means having the same characteristics. In so doing, however, it is desirable to give initial consideration to the essential features of such a nozzle.

The important characteristic of a small tube, which governs the friction loss in that tube, is the ratio:

$$\frac{\text{Cross section area}}{\text{Wetted perimeter}}$$

in other words, the ratio of the frictional surface to the thickness of the stream. This ratio is known as the "hydraulic radius." The significant point to note, in this connection is that all fluid ducts, of whatever cross sectional shape, will behave the same as regards friction loss, provided that they have the same "hydraulic radius." If it be assumed that "N" small tubes must be utilized in the construction of a nozzle of the type contemplated and that each has a diameter, inside, of D inches, the hydraulic radius of each tube is then:

$$=\frac{\text{X-Section area}}{\text{Wetted perimeter}}=\frac{\frac{\pi D^2}{4}}{\pi D}=\frac{D}{4}$$

The total area of all the tubes together is:

$$N \times \text{area of each} = \frac{N \cdot \pi D^2}{4}$$

What is desired, therefore, is a duct of some sort, so shaped that its hydraulic radius $$=\frac{D}{4}$$

and of such size that the X-Section area $$=\frac{N \cdot \pi D^2}{4}$$

The shape selected must also be easily cleaned, and susceptible of adjustment for different pressures. The shape that best fulfills these conditions is an annular duct, as illustrated in the drawings. To determine the hydraulic radius of this annular space.

$$\text{Hydr. Rad.} = \frac{\text{X-Section Area}}{\text{Wetted Surface}}$$

$$=\frac{\frac{\pi}{4}(d_1^2-d_2^2)}{\pi(d_1+d_2)}$$

$$=\frac{d_1-d_2}{4}$$

It has been previously shown that in an ordinary cylindrical pipe, the hydraulic radius $$=\frac{D}{4}$$

Therefore, to get an annular space with the same flow characteristics as the ordinary pipe;

$$d_1-d_2=\frac{D}{4} \tag{1}$$

and $$\frac{\pi}{4}(d_1^2-d_2^2)=\frac{N\pi D^2}{4} \tag{2}$$

from (1)

$$d_1-d_2=D \tag{3}$$

and from (2)

$$d_1^2-d_2^2=ND^2 \tag{4}$$

Thus, if Equations 3 and 4 are fulfilled, an annular duct with exactly the same flow characteristics as the ordinary cylindrical pipe is the result, and one which will, under identical conditions deliver the same quantity of fluid.

It is of course necessary to determine, in designing liquid discharge devices embodying the invention, the length of such device or, if the length be established in advance, the other material dimensions of a device having such length and which is capable of functioning in the desired manner. As previously stated, the formula commonly used for calculating the flow of liquid in pipes is:

$$h_f = f \cdot \frac{L}{D} \cdot \frac{V^2}{2g}$$

where:
$h_f$=loss of pressure due to friction
$f$=a coefficient depending on Reynolds number
L=length of the pipe
D=diameter of pipe
V=velocity of flow
$g$=acceleration due to gravity Let quantity of liquid flowing per unit time=Q. Now $Q=AV$ where A is the area of the duct $$Q=\frac{\pi D^2 V}{4}$$

Thus $$V=\frac{4Q}{\pi D^2}$$

Substituting this value of V in the general equation $$h_f = f \cdot \frac{L}{D} \cdot \frac{\frac{16Q^2}{\pi^2 D^4}}{2g}$$

$$= f \cdot \frac{L}{D^5} \cdot \frac{16Q^2}{\pi^2 \cdot 2g}$$

In any specific design problem, it is desirable to keep the Reynolds number, and therefore the value "$f$", constant. It is also desirable to design for some specific quantity of flow per unit time. Thus "$f$" and "Q" will be constants, and the flow equation may be written:

$$h_f = \frac{L}{D^5} \cdot \text{Constant}$$

This equation shows that the loss of pressure due to friction will vary directly as the length (L) of the passages, and inversely as the 5th power of the diameter (D) of these passages.

Thus, for every size of capillary space which may be selected, there is some definite length which must be used in order to create the desired friction loss in the liquid.

It will be understood that practical considerations will set limits upon the values of L and D which may be used. For example, if the diameter of the capillaries is made too large, then the necessary length becomes impractical. (An annular capillary with a ¼"-wide opening would have to be over a mile long to use up the same pressure energy as a 2"-long capillary with an opening .002 inch wide.)

Conversely, the value of D may not be too small, because such capillaries would be hard to make, prone to become plugged with tiny particles from the liquid, and so forth.

From the above, it will be seen that, for a given set of conditions, there is a positive relationship that must be maintained between the size of the capillaries and their length, if efficient performance is to be had.

It is a feature of the invention that this ratio of length to width of opening has been set in strict accordance with the equation:

$$h_f = \frac{L}{D^5} \cdot \text{Constant}$$

and that by this means there has been obtained efficiency of performance not otherwise attainable.

It is clear that, by following the method of design above set forth, various types of liquid velocity retarding arrangements may be originated, each having the ability to use up or consume the potential energy of a liquid by frictionally resisting its flow, while at the same time maintaining streamline or viscous movement of such liquid, the pressure and velocity of the issuing liquid stream both approaching zero.

Having thus described the invention, what is claimed as new and desired to be secured by Letters Patent is:

1. In a dispensing apparatus, in combination, means defining a chamber for the reception of a liquid to be dispensed, a plunger for displacing liquid previously flowed into said chamber, fluid pressure responsive means for moving said plunger on its displacing stroke, said means including an expansible fluid-containing cell a portion of which engages the plunger, a second fluid-containing cell adapted to contract when subjected to outside pressure, and a member having an elongated duct formed therein through which fluid may pass from the second cell to the first cell, whereby the application of pressure to the second cell will result in expansion of the first cell and actuation of said plunger.

2. The combination set forth in claim 1 in which the duct formed in said member is relatively long and narrow so that the flow therethrough is non-turbulent and the liquid issues from its discharge port at relatively low pressure.

3. The combination set forth in claim 2 in which the duct formed in said member is so shaped that a current of liquid flowing therethrough is relatively wide and thin in cross section, and relatively long, thus being film-like in nature so that the liquid flow is non-turbulent.

4. Dispensing apparatus comprising in combination, two fluid ducts, each leading from a source of fluid supply to a point of discharge, a valve associated with each duct for controlling the flow of liquid therethrough, a fluid pressure actuated metering means for delivering fluid into one of said ducts, and a conduct leading from said means to a point in the second duct posterior to the valve in said duct whereby the pressure of the fluid flowing through said second duct is communicated to said metering means when the valve in said second duct is open and is cut off when said valve is closed.

5. The combination set forth in claim 4 in which said second duct is provided with a fluid pressure reducing means posterior to the valve and said conduit opens into said second duct at a point intermediate the control valve therefor and said pressure reducing means.

6. Dispensing apparatus comprising in combination, a conduit for a liquid under pressure leading from a source of supply to a discharge port, liquid pressure reducing means in said conduit, a flow controlling valve intermediate the supply source and pressure reducing means, an additional liquid conduit, and means activated by the pressure existing in the first mentioned conduit intermediate the valve and pressure reducing means for effecting the flow of fluid through said additional conduit.

7. The combination set forth in claim 6 in which a second valve controls the flow of fluid through said additional conduit and means is provided for simultaneously opening and closing said valves.

8. In a dispensing apparatus in combination, a liquid storage vessel having a discharge aperture through which liquid may escape, means defining a chamber for receiving liquid flowing through said aperture, a substantially vertical duct for receiving liquid from said chamber and leading it to a point of discharge, said duct being mounted for limited vertical movement, a valve for closing said aperture, a valve for closing the mouth of said duct and means connecting said valves whereby, when the duct is elevated, the duct closing valve is seated and the aperture closing valve is unseated and, when the duct is lowered, the aperture closing valve is seated and the duct closing valve is unseated.

9. The combination set forth in claim 8 in which resilient means normally maintains the said duct in raised position, with the duct closing valve closed and the other valve open.

10. In a dispensing apparatus, in combination, two independent liquid ducts leading from separate sources of supply to closely adjacent ports of discharge, means for controlling the flow of liquid through one duct, and means activated by the pressure of the liquid flowing through said first mentioned duct, for flowing liquid through the other duct, whereby flow through both ducts will be simultaneously initiated and terminated.

11. In a dispensing apparatus, in combination, a primary duct for leading liquid from a source of supply to a port of discharge, a plurality of secondary ducts leading, respectively, from additional supply sources to discharge ports adjacent said first mentioned discharge port, a flow control device for the primary duct, a flow control means for each secondary duct, and mechanism for selectively operating said secondary flow control means, said mechanism effecting operation of said primary flow control means whenever any one of the secondary flow control means is actuated.

12. Dispensing apparatus of the type described comprising, in combination, a source of supply of liquid under greater than atmospheric pressure, a second source of liquid supply, a pressure responsive device for pumping, when actuated, a measured quantity of liquid from said second source and delivering it to a point of discharge, two ducts connected to and leading from said source of supply of liquid under pressure one such duct being adapted to deliver liquid to a second discharge port and the other to said pressure responsive device, and valve means for controlling the flow of liquid under pressure through said ducts.

13. Dispensing apparatus of the type described comprising, in combination, a source of supply of liquid under greater than atmospheric pressure, a second source of liquid supply, a pressure responsive device for pumping, when actuated, a measured quantity of liquid from said second source and delivering it to a point of discharge, two ducts connected to and leading from said source of supply of liquid under pressure one such duct being adapted to deliver liquid to a second discharge port and the other to said pressure responsive device, and valve means which, when opened, permits liquid under pressure to flow substantially simultaneously to said second discharge port and to said pressure responsive device.

14. Dispensing apparatus comprising in combination, first and second fluid ducts, each extending from a source of supply to a discharge port, a valve associated with each duct for controlling the flow of liquid therethrough, fluid metering means, including a fluid pressure responsive member, for effecting flow of liquid through the second duct when the valve controlling that duct is in open position, and a conduit extending from the metering means to a port in the first duct located posterior to the valve in that duct through which conduit liquid may flow to make direct contact with said pressure responsive member, so that the metering means is actuated by the pressure of fluid from the first duct when the valve in the first duct is in open position.

15. The combination set forth in claim 14 in which the metering means includes a flexible diaphragm and the conduit is disposed to lead fluid from the first duct into direct contact with said diaphragm.

16. In a dispensing apparatus, in combination, a liquid storage tank having a discharge aperture in its bottom, means defining a chamber arranged to receive liquid discharging through said aperture, a duct leading from said chamber to a discharge port, valves for controlling the flow through said aperture and duct respectively, said valves being interconnected so as to be simultaneously movable, means supporting the duct for movement relatively to the associated valve to thereby control the flow of liquid thereto, and means for flowing liquid from said chamber into said duct when the duct controlling valve is opened.

BRUCE G. COPPING.

REFERENCES CITED

The following references are of record in the file of this patent:

UNITED STATES PATENTS

| Number | Name | Date |
|---|---|---|
| 652,810 | Robertson | July 3, 1900 |
| 730,286 | Moser | June 9, 1903 |
| 881,553 | Cornish | Mar. 20, 1908 |
| 883,176 | Davis | Mar. 31, 1908 |
| 1,316,528 | Wooten et al. | Sept. 16, 1919 |
| 1,429,574 | England et al. | Sept. 19, 1922 |
| 1,436,009 | Butterfield | Nov. 21, 1922 |
| 1,746,597 | Lind | Feb. 11, 1930 |
| 1,934,755 | Williams | Nov. 14, 1933 |
| 2,029,141 | Warner | Jan. 28, 1936 |
| 2,032,163 | Bagby | Feb. 25, 1936 |
| 2,085,848 | Cornelius | July 6, 1937 |
| 2,119,250 | Smith | Mar. 31, 1938 |
| 2,132,011 | Bennett et al. | Oct. 4, 1938 |

FOREIGN PATENTS

| Number | Country | Date |
|---|---|---|
| 134,625 | Germany | Sept. 17, 1902 |